May 12, 1959 J. GARDBERG 2,886,797

FIXED MESSAGE SIGNAL GENERATOR

Filed Oct. 31, 1955 2 Sheets-Sheet 1

INVENTOR
JOSEPH GARDBERG

BY Emery Robinson
ATTORNEY

INVENTOR
JOSEPH GARDBERG
BY Emery Robinson
ATTORNEY

United States Patent Office 2,886,797

Patented May 12, 1959

2,886,797

FIXED MESSAGE SIGNAL GENERATOR

Joseph Gardberg, Chicago, Ill., assignor to Teletype Corporation, Chicago, Ill., a corporation of Delaware Application October 31, 1955, Serial No. 543,691

10 Claims. (Cl. 340—166)

Figures 1, 3:
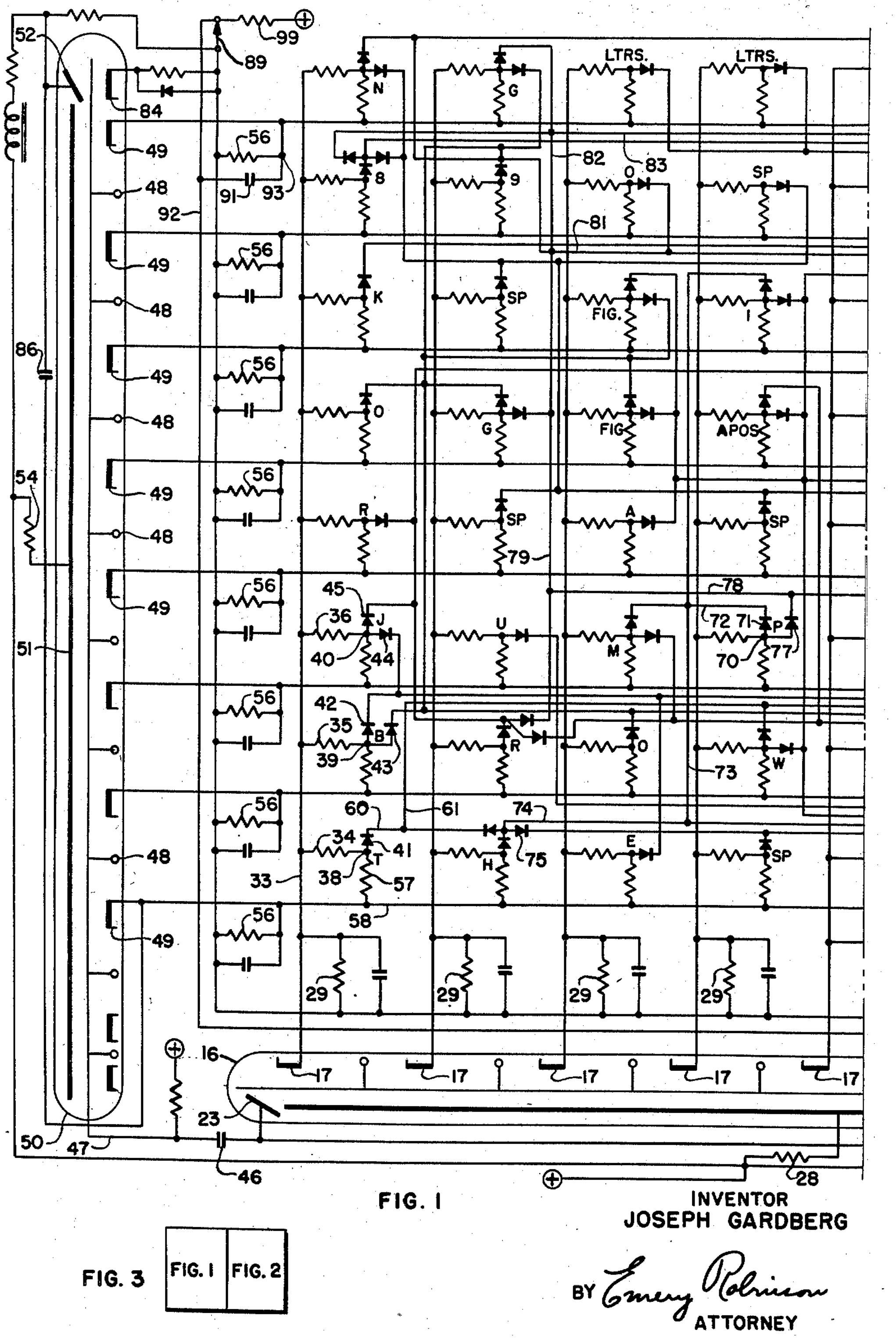

This invention relates to a fixed message signal generator and more particularly to a generator having a fixed number of signal originating points which are sequentially operated to successively apply permutation code signals on a plural wire output circuit.

Often times it is necessary to check the proper functioning of complex telegraph transmission systems and the equipment included therein by transmitting through said system to said equipment a fixed message pattern of signals. In order to properly check the system the fixed message should contain all the letters of the alphabet, the numerical signals and all the functions normally encountered during intelligence and switching transmission. Heretofore paper tapes have been prepared containing the message "THE QUICK BROWN FOX JUMPED OVER THE LAZY DOG'S BACK, 1234567890" plus desired nonprinting functions. These tapes have proved satisfactory for several transmissions, but after a period of use the holes become worn and frayed thus resulting in the generation of unreliable signals. Other means can be used to generate the fixed message such as multi-lobed cams but again other disadvantages are inherent in their use; such as, slow speed, high initial costs, large mass of components, failure of mechanical parts, and high maintenance costs.

It is a primary object of this invention to provide an inexpensive electronically controlled signal generator for accurately controlling the production of a test pattern of signals.

Commensurate with the first object, it is a second object to provide a pair of electrical distributors for sequentially and successively energizing a vast number of signal originating points.

Another object of the invention resides in a diode controlled maze circuit for applying the output of each energized signal originating point to a plurality of output lines in accordance with a permutation code.

An additional object of the invention is the provision of facilities for conditioning a number of signal originating points by operation of one stage of a multi-stage distributor and successively energizing the conditioned points by the successive operation of the stages of a second multi-stage distributor.

A further object of the invention resides in control circuits for halting the transmission of the test message at any position and thereafter re-initiating transmission whereupon preselected control signals are first transmitted and subsequent thereto the fixed message is transmitted from its start.

With these and other objects in view the present invention contemplates a set of output wires upon which a test pattern of signals is to be impressed. The wires are connected through a diode maze circuit to a plurality of signal originating points each of which is capable of determining the character of one signal in the test pattern. A pair of resistances are connected to each signal originating point as well as one or more diodes that function to electrically isolate each point from the maze circuit.

A first multi-stage distributor has a connection running from each stage to a plurality of resistances. A second distributor is provided and has a connection running from each stage to the remaining resistances. Further, the first distributor is connected to the second so that upon each complete cycle of operation, a pulse is generated and applied to advance the operative stage of the second distributor.

A suitable pulsing means applies operating pulses at a constant frequency to drive the first distributor through a cycle of operation. As the first pulse is received a first stage is operated in both the first and second distributors causing the development of potentials across the associated resistances. The rise in potential across the resistances is reflected in a rise in potential of the circuit originating point connected therebetween and hence the diode or diodes connected to this point are permitted to impress a rise in potential through the maze circuit to energize a permutation of the output wires. Receipt of subsequent pulses successively causes the circuit originating points which are associated with the first stage of the second distributor, to rise in potential and thus apply various signal conditions on the output wires. Upon completion of a cycle of operation of the first distributor, a pulse is generated to step the second distributor and the signal originating points associated with the second stage of the second distributor are successively rendered effective to control the generation of permutation code signals. Upon completion of a cycle of operation of the second distributor, the first stage thereof is again operated to initiate the transmission of another identical fixed message.

The invention features control circuits which permit the interruption of transmission of the message at any desired point. Transmission may be re-initiated whereupon facilities are actuated to cause the transmission of a "carriage return," "line-feed" and "letters" signals and thereafter the fixed message is transmitted from its beginning.

Figure 2:
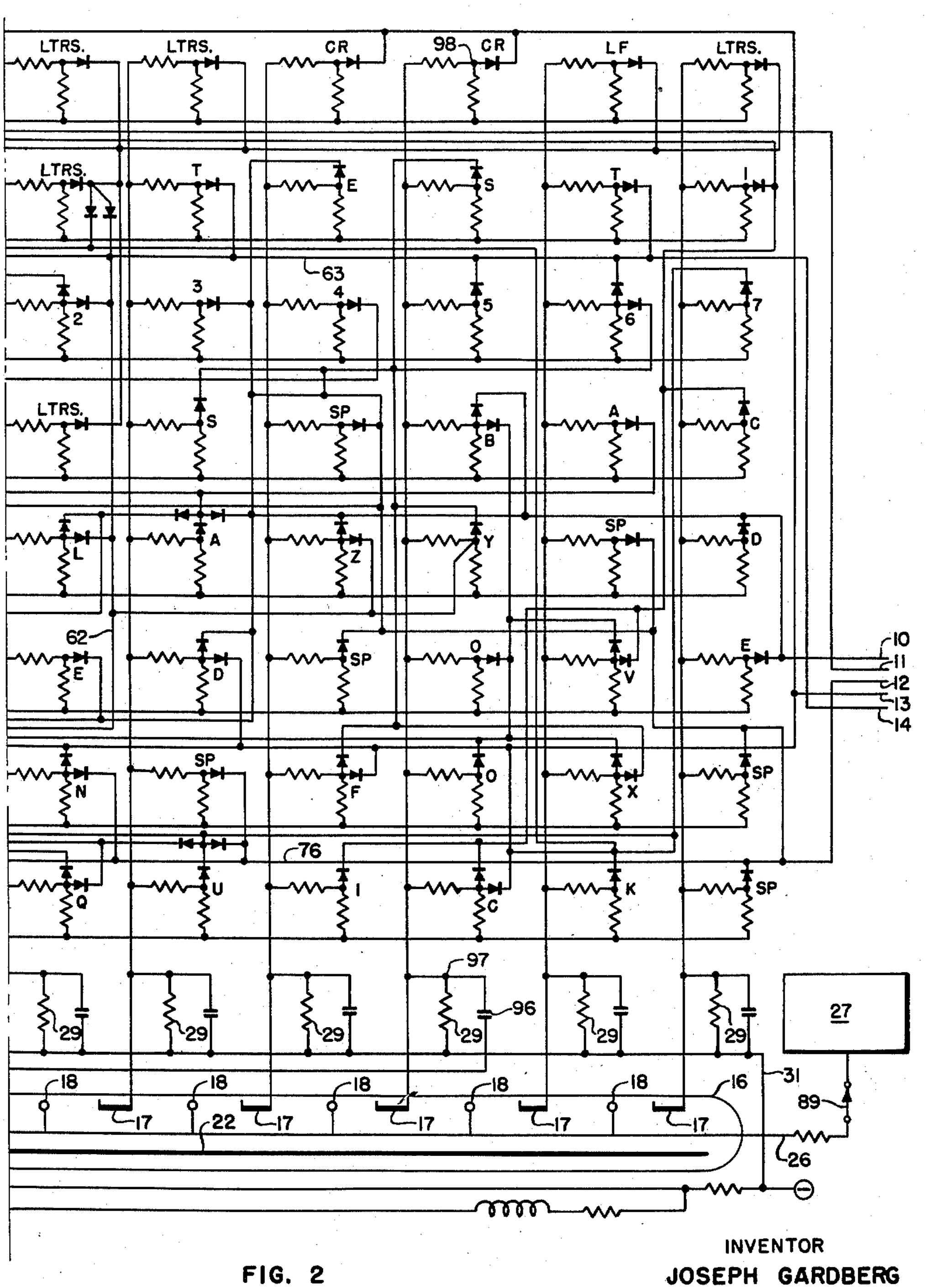

Other objects and advantages will become readily apparent upon consideration of the following detailed description when considered in conjunction with the accompanying drawings wherein:

Figs. 1 and 2 when assembled in the manner illustrated in Fig. 3 depict the circuits required to produce a fixed message signal generator embodying the principal features of the present invention.

Referring to Figs. 1 and 2 when assembled in the manner shown in Fig. 3 and particularly to Fig. 2 there is shown a group of five wires 10, 11, 12, 13, and 14 on which it is desired to impress signals to be eventually utilized to test the proper functioning of switching apparatus or printing telegraph apparatus. These signals may be in the form of a permutation of potentials that are in accordance with the well known Baudot code.

In the lower portions of Figs. 1 and 2 there is shown an expanded envelope of a tube 16. This tube is of the general type shown in the patent to M. A. Townsend, No. 2,575,370, issued November 20, 1951, and has a row of cold cathodes such as designated by the reference numerals 17 and 18, a common anode 22, and an auxiliary anode 23. As described in this patent, only one cathode-anode gap is broken down at a time. The discharge progresses from one cathode to the next under the control of negative impulses applied on a lead 26 from a source of negative pulses 27. The common anode 22 is connected through a suitable resistance 28 to a source of positive potential. The cathodes 17 are connected through resistances 29 to a common lead 31 running to a source of negative potential.

Assuming that a discharge has occured between a cathode 17 and the anode 22, then the appearance of a negative potential on the lead 26 drives all the cathodes 18 negative with respect to the cathodes 17, consequently a breakdown occurs between the anode 22 and the adjacent cathode 18. The reason that the gap is established between the adjacent cathode 18 and the anode 22 resides in the fact that the discharge between the cathode 17 and the anode 22 ionized the region near the adjacent cathode 18. Upon cessation of the negative pulse on the lead 26 the discharge gap is transferred from the common anode and cathode 18 to the next succeeding cathode 17. The cathodes 17 and 18 are so constructed that the transfer and discharge takes place in a left to right direction.

It will be noted that the cathode 17 associated with the auxiliary anode 23 is connected not only to the resistance 29 but also to a cross lead 33. The cross lead is connected through a number of resistances such as resistances 34, 35 and 36 to junction points 38, 39 and 40. Each junction point is isolated from a maze circuit by means of diodes such as 41, 42, 43, 44 and 45. As will more clearly appear during the subsequent description, the the maze circuit is arranged to connect each junction point with one or more of the output wires 10 to 14, inclusive.

The auxiliary anode 23 is connected through a coupling capacitor 46 to a lead 47 which is connected to a number of cathodes 48 of a second multi-stage distributor tube 50. Tube 50 is quite similar to tube 16 and has in addition to the cathodes 48, a plurality of working cold cathodes 49, a common anode 51 and an auxiliary anode 52. It will be noted that the common anode 51 is connected through a resistance 54 to the same source of positive potential that the common anode resistance 28 was connected to. Each time a discharge takes place between the auxiliary anode 23 and its associated cathode 17, capacitor 46 is permitted to discharge through the arc established at the auxiliary anode causing a negative voltage change on lead 47 to drive each of the cold cathodes 48 negative with respect to the associated working cathodes 49. The discharge is transferred from the operating cathode 49 to the next succeeding cathode 48 for the duration of the negative impulse. Upon termination of the negative impulse the discharge is transferred to the gap between the next succeeding cathode 49 and the common anode 51. The construction of the cathodes 48 and 49 in tube 50 is such that discharge progresses from bottom to top as viewed in Fig. 1.

Each of the cathodes 49 is again coupled by means of a resistance 56 to the common lead 31 which as previously mentioned is connected to negative battery. Looking at the lowermost connected cathode 49 it will be noted that it is connected to a resistance 57 which in turn is connected to the junction point 38. It will be noted that each cathode 17 of the tube 16 is connected to a vertical cross lead, such as lead 33, and that each cathode 49 of the tube 50 is connected to a horizontal cross lead such as lead 58. Cross junction points are established for each pair of horizontal and vertical leads through a pair of resistances, such as through resistances 34 and 57 to junction point 38. Each junction point is isolated by one or more diodes from the maze circuit running to the five output leads 10 to 14.

The circuit through the maze from junction point 38, when the potential at the junction point is raised, may be traced through the diode 41, over a lead 60, over the lead 61, over a lead 62, over a lead 63, to the lead 14. It will be noted that only one output lead is energized and that this lead is the No. 5 lead and in accordance with the Baudot code this pattern of energization of the output leads is representative of the letter T. Each of the other junction points have letters associated therewith which represent one of the signals to be transmitted in the test message sequence: "THE QUICK BROWN FOX JUMPED OVER THE LAZY DOG'S BACK, 1234567890."

In operation of the apparatus assume that all operating potentials have been applied to the system and conduction has been established through the gap between the auxiliary anode 23 and its associated cathode 17 and further that conduction has been established between the common anode 51 and the lower cathode 49 of the tube 50. Conduction through the cathode 17 is followed by the rise in the cathode potential due to the associated cathode resistance 29. This rise in potential is impressed over lead 33 and appears at junction point 38. Moreover, when conduction takes place through the lower cathode 49 of the tube 50, the cathode potential also rises and this rise in potential is likewise impressed on junction point 38. The cumulative effect of the rise in both cathode potentials manifests itself in the application of a potential through the diode 41 and through the maze circuit to the output lead 14. As previously stated energization of this output lead is indicative of a signal representative of the letter T.

As each succeeding negative pulse is applied on the lead 26 to successively drive the cathodes 18 negative with respect to the previously conducting cathode, the discharge in the tube 16 progresses from left to right. Upon termination of each negative pulse the conduction gap is transferred to the next succeeding cathode 17 to cause the successive generation of signals in accordance with the connection of the junction points in the first row to the maze circuit. More particularly, upon completion of the first cycle of operation of the distributor tube 16, signals are impressed on the output leads 10 to 14, inclusive, representative of the following: "The (space) quick (space)."

Following completion of a cycle of operation of the tube 16, the auxiliary anode 23 again has a conductive path established therefrom to its associated cathode 17 whereupon the auxiliary anode potential drops to impress a decreased potential through a capacitor 46 wherein it is differentiated to provide a negative going pulse for the cathodes 48. The appearance of a negative pulse on the cathode 48 transfers the conductive gap from the lower cathode 49 to the next succeeding transfer cathode 48. Immediately after termination of this pulse, the conductive gap is transferred to the second cathode 49. Receipt of subsequent stepping negative pulses by the tube 16 causes the conductive gap to be successively transferred in the manner heretofore explained and as a result thereof the junction points in the second tier are successively operated to control the impression of a sequence of signals on the output leads 10 to 14, inclusive. It will be noted that the characteristic signal generated by the successive energization of each junction point is designated by a code letter shown in the drawing as being either to the right or just above the junction points.

It is believed an understanding of the functioning of the maze circuit may be further enhanced by a consideration of the circuits energized to control the generation of another signal. Assume that the stages of the distributor tubes associated with a junction point 70 have been operated. With an increase in potential at the junction point 70, the diodes associated therewith will impress a potential condition on the output leads 10 to 14 which may be traced from the junction through a diode 71, over a lead 72, over a lead 73, over a lead 74, through a diode 75, over a lead 76, to the output lead 12. It is also possible to trace a circuit from the junction point 70 through a diode 77, over a lead 78, over a lead 79, over a lead 81, over the lead 63, to the output lead 14. The increased potential condition impressed on lead 79 is also impressed on lead 82 and through a lead 83 to the output lead 11. It will be noted that the second, third and fifth output leads have an increased potential impressed thereon which permutation of potential conditions is indicative of a signal representative of the letter P.

The tube 50 is successively stepped along, upon each complete cycle of operation of the tube 16, until the uppermost cathode 49 has the conductive gap established thereto. Following the next complete cycle of operation of the tube 16, the conductive gap is established between the auxiliary anode 23 and its associated cathode 17 causing anode potential thereof to drop. This drop is again impressed through the condenser 46 to the common cathode lead 47 to effectuate a transfer of the conductive path to the auxiliary anode 52, and an associated cold cathode 84. Immediately thereupon the potential of anode 52 drops and impresses a decreased potential through a coupling capacitor 86 to the lowermost connected cathode 49. The appearance of a decreased potential on this cathode 49 causes a conductive path to instantaneously transfer from the anode 52-cathode 84 to the gap between the common anode 51 and the lowermost cathode 49. The circuit is now in condition to transmit another identical sequence of signals.

It will be noted that this particular arrangement of having the auxiliary anode 52 coupled to one of the cathodes 49 permits adjustment in the number of stages in the multi-stage tube 50. The lead could be connected to any of the other cathodes 49 and the distributor started from that point in its cycle of operation.

Transmission of the sequence of signals may be interrupted at any time by opening a switch 89 having two circuit breaking elements. The circuit breaking element shown in the lower right-hand corner of Fig. 2 interrupts the impression of further negative pulses on the cathodes 18, thus precluding further stepping of the multi-stage distributor tubes.

The opening of the circuit breaking element 89 shown in the upper left-hand portion of Fig. 1 removes negative battery from the junction of resistor 99 and the left-hand plate of condenser 91. Positive battery is now solely impressed on a lead 92 and as the right-hand plate of the condenser 91 is connected through the resistance 56 to the lead 31 and to negative battery, the result is that the condenser 91 assumes a charged condition. Now when transmission is to be recommenced, it is desired that the test message be transmitted from its start rather than from the point of interruption. In order to attain this desirable result transmission is recommenced by closing the switch 89 whereupon the condenser 91 is discharged through the resistance 56 consequently driving a junction point 93 in a negative direction. When junction point 93 becomes negative, the uppermost cathode 49 connected thereto is also driven negative to transfer the conducting gap from wherever it was established to span the gap between the upper cathode 49 and the common anode 51.

When the switch 89 was opened positive battery on the lead 92 was also impressed on a condenser 96 (Fig. 2) to charge this condenser through an associated resistance 29 connected to the lead 31 and to negative battery. Reclosure of the switch 89 causes the condenser 96 to discharge through the resistance 29, hence driving a junction point 97 negative. The negative charge at junction point 97 is impressed on the associated cathode 17 to transfer the conductive path in the tube 16 to the gap between the negatively charged cathode 17 and the common anode 22.

With the conductive paths through the tubes 16 and 50 now established, the junction point 98 (upper portion of Fig. 2) is raised in potential to impress on the output leads 10 to 14, inclusive, a signal condition which is indicative of a "carriage return" function. Reclosure of the switch 89 also again permits negative pulses to be impressed on the cathode lead 26 to again cause the tube 16 to commence stepping. Thereafter as the next two conductive paths are established through the tube 16 a sequence of signals indicative of "line-feed" and "letters" are impressed on the output leads 10 to 14. Upon the next receipt of a negative pulse on the cathode lead 26, the auxiliary anode 23 again has conductive path established thereto and the system is now in condition to commence transmission of a test message pattern from the start.

It is to be understood that the above arrangement of circuit elements and construction of component parts are simply illustrative of an application of the principles of the invention and many other modifications may be made without departing from the invention.

What is claimed is:

1. In a signal generator, a plurality of signal originating points, a plural wire output circuit, a maze circuit interconnecting each originating point with various permutations of wires in the output circuit, gating circuits isolating each signal originating point from the maze circuit, a first distributor having a plurality of stages each of which is adapted to condition a plurality of said gating circuits for operation, a second distributor having a plurality of stages each of which is adapted to operate a conditioned gating circuit, means for driving the second distributor to successively operate each stage thereof, and means operated by a predetermined stage of the second distributor for advancing the operative stage of the first distributor.

2. In a fixed message signal generator, a predetermined number of output wires, an electrical maze network connected to the ends of the wires and terminating at the other end in individual junction points, each junction point being representative of one signal to be impressed on the output wires, a diode isolating each junction point from the remainder of the maze, a pair of resistances individually connected to each junction point, a first multi-stage distributor having each stage connected to a plurality of said resistances, a second multi-stage distributor having each stage connected to a plurality of resistances whereby each of said pairs of resistances is connected to stages in both the first and second distributors, means to drive the second distributor to successively operate each succeeding stage, and means operated by the second distributor to advance the operation of the first distributor one stage upon each complete cycle of operation of said second distributor.

3. In a signal generator, a plurality of signal originating points, a plural wire output circuit, a maze circuit interconnecting the signal originating points with the plural wire output circuit in varous permutative arrangements, diode means isolating each signal originatng point from the maze circuit, dual resistive circuits connected to each signal originating point, a first multi-stage electronic distributor having each stage connected to a plurality of first resistive circuits, a second electronic multi-stage distributor having each stage connected to the remaining resistive circuits, means for operating a stage in the first distributor to condition the resistive circuits connected thereto, means for successively operating the stages of the second distributor to successively operate the conditioned resistive circuits whereby the associated diodes are successively rendered conductive to impress a succession of permutative signal conditions on the output circuit, and means actuated by the completion of a cycle of operation of the second distributor for advancing the operative stage of the first distributor.

4. In a fixed message signal generator, a plurality of output wires, a plurality of signal originating points, a maze circuit interconnecting each originating point with various permutations of wires in the output circuit, a gating circuit isolating each signal originating point from the maze circuit, a first multi-stage electronic distributor having a cathode in each stage connected to a plurality of said gating circuits, a second multi-stage electronic distributor having a cathode in each stage connected to a plurality of said gating circuits, means for operating a stage in said first distributor to cause its cathode potential to rise and thereby condition the gating circuits connected thereto, means for successively operating the stages of the second distributor to successively raise the cathode potentials whereby the conditioned gating circuits are successively operated, and means actuated by a drop in anode potential of a predetermined stage in the second distributor for advancing the operative stage in the first distributor.

5. In a signal generator, a plurality of signal originating points, a plural wire output circuit, a maze circuit interconnecting the signal originating points with the plural wire output circuit in various permutatve arrangements, gating circuits isolating each signal originating point from the maze circuit, a first distributor having a plurality of stages each of which is connected to condition a plurality of the gating circuits, a second distributor having a plurality of stages connected to operate said conditioned gating circuits, means for driving said second distributor to successively operate the conditioned gating circuits, means actuated by the second distributor for driving the first distributor to successively advance the operative stage until a special stage is operated, and means coupling the special stage of said first distributor to the first stage of said first distributor for immediately operating said first stage and rendering said special stage inoperative.

6. In a fixed message signal generator, a plurality of signal originating points, a plurality of output transmission wires, a maze circuit interconnecting each signal originating point with various permutations of output wires, a gating circuit connected to each originating point for isolating said originating points from the maze circuit, means for cyclically and successively operating each gating circuit to transmit signal conditions through the maze circuit and onto the output transmission wires, means for interrupting the operating means to interrupt the transmission of signals, and means for reinitiating transmission by the operating means from a predetermined originating point other than the point that was controlling the output wires when the operating means was interrupted.

7. In a fixed message signal generator, a plurality of signal originating points each being indicative of one signal in the fixed message, a plurality of output wires, a maze circuit interconnecting each signal originating point with various permutations of output wires, gating circuits connected to said signal originating points for isolating said point from the maze circuit, a first distributor for successively conditioning a predetermined number of said gating circuits, a second distributor for successively operating the conditioned gating circuits, first means for driving the second distributor, means actuated by the second distributor for driving the first distributor, means for interrupting the first driving means, and means actuated by the restoration of the interrupting means for actuating the first and second distributors to operate a predetermined gating circuit.

8. In a fixed message signal generator, a plurality of signal originating points, a predetermined number of output wires, a maze circuit interconnecting each point with various permutations of output wires, gating means isolating each signal originating point from the maze circuit, a first multi-stage electronic distributor having at least an anode and cathode in each stage, means connecting each cathode to a series of gating means, a second multi-stage electronic distributor having an anode and cathode in each stage, means connecting each cathode to a series of gating means whereby each gating means is connected to a cathode in both the first and second distributors, means for driving said distributors to successively operate each gating means to generate a fixed sequence of signals, energy storage means associated with a cathode in the first distributor and a cathode in the second distributor, means for interrupting the driving means and operating said energy storage means, and means for applying said stored energy to operate the stages of the distributors associated therewith.

9. In combination, a first electronic multi-stage distributor having a cathode and anode in each stage, a second electronic multi-stage distributor having a cathode and anode in each stage, a first energy storage circuit connected to a cathode in the first distributor, a second energy storage circuit contacted to a cathode in the second distributor, means for rendering ineffective said energy storage circuits, means for driving the second distributor, means connected to an anode in one stage of said second distributor for driving the first distributor, means for interrupting the driving means for the second distributor and rendering effective both said energy storage means to store energy therein, and means for applying said stored energy in both said energy storage circuits to operate the associated stages of the distributor.

10. A signal generator which comprises a distributor having a plurality of electronic stages from which an output signal is obtained, means for applying pulses to the distributor stages to operate such stages successively, a charging circuit connected to one of said stages, first switching means operable to suspend effective operation of said pulse applying means and restorable to cause resumption of effective operation of said pulse applying means, and second switching means operable to cause activation of said charging circuit and restorable to cause operation of the distributor stage associated with said charging circuit.

References Cited in the file of this patent

UNITED STATES PATENTS

| | | |
|---|---|---|
| 2,577,141 | Mauchly | Dec. 4, 1951 |
| 2,609,451 | Hansen | Sept. 2, 1952 |
| 2,648,725 | Wright | Aug. 11, 1953 |
| 2,749,484 | Levitt | June 5, 1956 |